United States Patent [19]

Kida et al.

[11] Patent Number: 4,803,252
[45] Date of Patent: Feb. 7, 1989

[54] PARTICLES OF CROSSLINKED POLYMER PREPARED BY EMULSION POLYMERIZATION IN THE ABSENCE OF DISPERSION STABILIZER

[75] Inventors: Katsuaki Kida; Akio Kashihara, both of Osaka; Keizou Ishii, Hyogo; Hiromichi Kayano, Osaka, all of Japan

[73] Assignee: Nippon Paint Co., Ltd., Osaka, Japan

[21] Appl. No.: 890,483

[22] Filed: Jul. 29, 1986

[30] Foreign Application Priority Data

Jul. 29, 1986 [JP] Japan ............................... 60-168439

[51] Int. Cl.$^4$ ..................... C08F 20/10; C08F 120/10; C08F 220/10
[52] U.S. Cl. .................................. 526/297; 526/310; 526/303.1; 526/323.2; 526/317.1
[58] Field of Search ............... 526/323.2, 323.1, 303.1, 526/307.3, 317.1, 320, 318.2, 319

[56] References Cited

U.S. PATENT DOCUMENTS

| | | | |
|---|---|---|---|
| 4,069,378 | 1/1978 | DeMarco | 526/323.1 |
| 4,103,081 | 7/1978 | Repetto | 526/323.1 |
| 4,269,959 | 5/1981 | Lawton | 526/323.2 |
| 4,533,710 | 8/1985 | Olson et al. | 526/323.2 |

OTHER PUBLICATIONS

Chem. Abstracts vol. 90, entry 2045990 1979.
Chem. Abstracts vol. 82, entry 582002, 1975.

Primary Examiner—Joseph L. Schofer
Assistant Examiner—Peter F. Kulkosky
Attorney, Agent, or Firm—Wenderoth, Lind & Ponack

[57] ABSTRACT

Particles of crosslinked polymer obtained by the copolymerization of a defined amount of particular di (meth) acrylol bearing compound and other copolymerizable unsaturated monomer through an emulsion polymerization technique without using an emulsifier and a coating composition containing thus obtained particles of crosslinked polymer with excellent film properties.

2 Claims, No Drawings

PARTICLES OF CROSSLINKED POLYMER PREPARED BY EMULSION POLYMERIZATION IN THE ABSENCE OF DISPERSION STABILIZER

FIELD OF THE INVENTION

The present invention relates to particles of novel crosslinked polymer, its preparation and a coating composition containing the same.

Background of the Invention

A polymer emulsion obtained by an emulsion polymerization of a polymerizable monomer or a combination of 2 or more copolymerizable monomers is called as a synthetic latex and has been used in many products including an aqueous coating composition, adhesive material and the like as it is. Stability of such emulsion is mainly dependent on the amounts of emulsifier or protective colloid material used and will rise in proportion as the amounts increase. Generally used emulsifiers are anionic, cathionic or nonionic surfactants, and the protective colloid materials are water soluble polymers as CMC, PVA, hydroxyethyl cellulose and the like. Therefore, the presence of such emulsifier or protective colloid material is essential in a synthetic latex paint, and however, it is nothing but an impurity for a dry coating.

If there remains a quantity of such impurities in a dry coating, they will have undesired effects on film properties and especially on water resistance weather resistance and the like. This is especially true when crosslinked polymer particles are used in a coating composition, since a larger amounts of emulsifier are required for the stabilization of said particles as compared with the cases with normal resin particles.

It is, therefore, an object of the present invention to provide cross-linked polymer particles which are prepared by using no or very small amounts of emulsifier or protective colloid that may cause undesired effects on film properties and which can be used in either aqueous or solvent type coating compositions. Another object of the present invention is to provide novel cross-linked polymer particles for capable of giving a coating composition capable of forming a coating with excellent water resistance, alkali resistance, weather resistance and hardness. The other objects of the invention are to provide a preparation method of such crosslinked polymer particles and a coating composition containing the same.

The other objects will be clear from the following description of the specification and claims. The abovesaid and other objects of the present invention are attained by the novel crosslinked polymer particles obtained by the copolymerization of 0.5 to 50 parts by weight of di (meth) acryloyl bearing compound (A) represented by the formula:

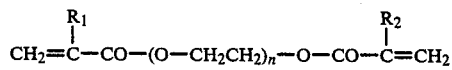

wherein $R_1$ and $R_2$ each represents hydrogen or methyl group and n is an integer of 4 to 30, and 99.5 to 50 parts by weight of at least one other copolymerizable unsaturated monomer (B). The present crosslinked polymer particles may be advantageously prepared by an emulsion polymerization of the defined amounts of the compound (A) of the abovesaid formula and at least one other copolymerizable unsaturated monomer (B) in an aqueous medium and in the absence of a dispersion stabilizer, or by a two step emulsion polymerization wherein an oligomer is first prepared by an emulsion polymerization of said (A) and said (B) and the crosslinked polymer particles are prepared by an emulsion polymerization of said (A) and said (B) using the abovesaid oligomer as an emulsifying agent.

Thus obtained crosslinked polymer particles are added to an aqueous or solvent type coating composition to improve water resistance, weather resistance and hardness of the coating prepared therefrom.

Since a polyethylene glycol di (meth) acrylate has two reactive unsaturation bonds in its molecule, it has been recognized and used only as a crosslinking monomer. For example, in Japanese patent application Kokai No. 63315/82, there discloses a process for preparing a polymer latex comprising reacting a monomer mixture of 2-ethyl hexyl acrylate, acrylic acid and (meth) acrylic acid ester, together with a polyethylene glycol dimethacrylate having a degree of polymerization of 9 to 14 by using, as an emulsifier, a specific nonionic surface active agent having a HLB of 8 to 17, through emulsion polymerization. However, said polyethylene glycol dimethacrylate is only taken as a crosslinking monomer and a particular emulsifier is used in that reaction. Furthermore, the amount of said crosslinking monomer is limited to 0.01 to 0.2 wt. % of the total monomer to get a lower degree of gelation for an intended object of having a polymer latex for an eye-liner use. The inventors, having made studies with an object of preparing gelated polymer particles without or with the least amount of emulsifier, have found that in an emulsion polymerization of $\alpha,\beta$-ethylenically unsaturated monomer(s), the polyethylene glycol di (meth) acrylates of the abovesaid formula could exhibit an excellent emulsifying function providing that n is 4 or more, that the polyethylene glycol di (meth) acrylates of the abovesaid formula, wherein n is up to about 30 are easily available or prepared and are excellent in emulsifying function, and that the abovesaid compounds are also useful as crosslinking monomers and for the object of having gelated polymer particles useful as an additive for a coating composition, the amount of said compound should be in a range of 0.5 to 50 wt. % of the total monomer, since the desired crosslinking could not be obtained at a lower level of less than 0.5 wt. % and the emulsion stability is too often disposed to be ruined at a higher level of more than 50 wt. %. On the basis of these findings, the presen invention has been made. The present crosslinked, acrylic polymer particles containing di (meth) acrylol group bearing compound (A) represented by the formula:

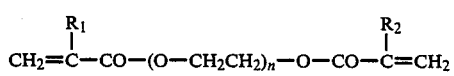

wherein $R_1$ and $R_2$ each represents hydrogen or methyl group and n is an integer of 4 to 30, in an amount corresponding to 0.5 to 50% by weight of the monomer components are novel and when added as resinous powder to an aqueous or solvent type coating composition, they do not have any baneful influence on the water resistance and weather resistance of the coating because of having no or the least amount of an emulsifier and they would rather improve water resistance, weather resistance, hardness and durability of the coating because of the characteristics of the coating with crosslinked polymer particles. As already stated, the present crosslinked polymer particles may be advantageously and easily prepared by an emulsion polymerization of the abovesaid compound (A) and other copolymerizable unsaturated monomer(s) (B) in an aqueous medium by using the compound (A) as an emulsifier. At that time, said di (meth) acrylol group bearing compound (A) having an emulsifying function should preferably be used in an amount corresponding to 0.5 to 50% by weight of the total monomer, for obtaing the gelated polymer particles of the present invention. By the selective use of this particular amount of compound (A), a fully satisfied dispersion stability of the system can be obtained without the necessity of using an emulsifying agent. The addition of other emulsifying agent is undesirable in most cases, and however, it may be permissible to use the least amount of additional emulsifier as desired. Even in the latter case, the amount of emulsifier in the reaction system is extremely low as compared with those of the heretofore proposed reaction systems and therefore, the disadvantages caused by the presence of emulsifier in a coating would be surely improved by the present invention. Therefore, in the present specification and in the claims, the term "in the absence of emulsifier" denotes both cases of using no emulsifier and of using an extremely smaller quantity of emulsifier as compared with those of the known processes. The inventors have also found that a comparatively lower molecular weight acryl polymer (the so-called oligomer) obtained by the reaction of said di (meth) acryloyl goup bearing compound (A) and other copolymerizable unsaturated monomer (B) does possess a similar emulsifying function and is useful as an emulsifying stabilizer in an emulsion polymerization of acrylic monomers. Therefore, the present crosslinked acrylic polymer particles may also be advantageously and easily prepared by the two step method comprising preparing an acrylic oligomer through an emulsion polymerization of the aforesaid di (meth) acryloyl group bearing compound (A) and other copolymerizable monomer (B) and effecting an emulsion polymerization of said compound (A) and said monomer (B) in the presence of thus obtained acrylic oligomer. In the most preferable embodiment of this alternative method, the crosslinked acrylic polymer particles of the present invention are prepared by the combination of steps of preparing an acrylic oligomer by an emulsion polymerization of di (meth) acryloyl group bearing compound (A) of the formula:

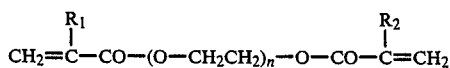

wherein $R_1$ and $R_2$ each represent hydrogen or methyl group and n is an integer of 4 to 30, and other copolymerizable unsaturated monomer (B) in a weight ratio of 9/1 to 1/9, in an aqueous medium, and effecting an emulsion polymerization of (A) and (B), or (B) alone, in an aqueous medium and in the presence of 1 to 30 wt parts of the total monomer to obtained the copolymer comprising 0.5 to 50 wt parts of said compound (A) and 99.5 to 50 wt parts of the other monomer (B). Examples of the di (meth) acryloyl group bearing compound (A) of the aforesaid formula are nonaethylene glycol di (meth) acrylate, undecaethylene glycol di (meth) acrylate, dodeca ethylene glycol di (meth) acrylate, tetradeca ethylene glycol di (meth) acrylate and the like. As the copolymerizable unsaturated monomer (B), any of the α,β-ethylenically unsaturated monomers customarily used for the preparation of acryl or vinyl resins may be satisfactorily used. They may be classified in the following groups.

(1) carboxyl group bearing monomer: e.g. acrylic acid, methacrylic acid, crotonic acid, itaconic acid, maleic acid, fumaric acid and the like,
(2) hydroxyl group bearing monomer: e.g. 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like,
(3) nitrogen containing alkyl acrylate or methacrylate: e.g. dimethylaminoethyl acrylate, dimethylaminoethyl methacrylate and the like,
(4) polymerizable amide: e.g. acrylamide, methacrylamide and the like,
(5) polymerizable nitrile: e.g. acrylonitrile, methacrylonitrile and the like,
(6) alkyl acrylate or methacrylate: e.g. methyl acrylate, methyl methacrylate, ethyl acrylate, ethyl methacrylate, n-butyl acrylate, n-butyl methacrylate, 2-ethyl hexyl acrylate and the like,
(7) polymerizable aromatic compound: e.g. styrene, α-methyl styrene, vinyl toluene, t-butyl styrene and the like,
(8) α-olefin: e.g. ethylene, propylene and the like,
(9) vinyl compound: e.g. vinyl acetate, vinyl propionate and the like,
(10) diene compound:
e.g. butadiene, isoprene and the like. These are used each alone or in combination of two or more. The present crosslinked polymer particles are, as already stated, useful as resinous powder for aqueous or solvent type coating compositions. Thus obtained coating compositions can result coatings with excellent properties, especially in respect of water resistance, weather resistance, pencil hardness and the like. The invention shall be now more fully explained in the following Examples. Unless otherwise being stated, all parts and percentages are by weight.

Example 1

Into a 1 liter flask fitted with a condenser, a thermoregulator, a nitrogen gas inlet tube, two dropping funnels, and a stirrer, were placed 520 parts of deionized water and the content was heated to 80° C. To this, an aqueous initiator solution of 1.6 parts of potassium persulfate in 80 parts of deionized water was dropwise added in 2 hours 40 minutes from the first dropping funnel. After elapsing 10 minutes from the commencement of addition of said initiator solution, a monomer mixture of 50 parts of NK ester 23G (trademark: polyethyleneglycol #1000 dimethacrylate, manufactured by Shin Nakamura Kagaku K.K.), 58 parts of methyl methacrylate, 68 parts of n-butyl acrylate, 6 parts of methacrylic acid and 18 parts of 2-ethyl hexyl methacrylate was dropwise added in 2 hours from the second dropping funnel. The reaction system was always maintained at around 80° C. After completion of the addition of polymerization initiator solution, the temperature of the reaction mixture was raised to 85° C. and the mixture was maintained at the same temperature, while stirring, for 1 hour. Thus obtained emulsion contained polymer particles having an average diameter of 230 nm. A part of said emulsion was spray-dried and the separated particles were added to methyl ethyl ketone and stirred. By this test, it was confirmed that the polymer particles were insoluble in methyl ethyl ketone and well crosslinked.

EXAMPLE 2

The same procedures as stated in Example 1 were repeated excepting revising the monomer mixture to a mixture of 80 parts of NK ester 14KG (trademark: polyethyleneglycol #600 dimethacrylate, manufactured by Shin Nakamura Kagaku K.K.), 30 parts of styrene, 70 parts of 2-ethyl hexyl acrylate, 4 parts of acrylic acid and 16 parts of hydroxypropyl acrylate, to obtain an emulsion containing the resinous particles having a mean diameter of 200 nm. The same test as in Example 1 was carried out and it was found that the polymer particles were insoluble in' methyl ethyl ketone and composed of crosslinked acrylic polymer.

EXAMPLE 3

Into a similar reaction vessel as used in Example 1, were placed 520 parts of deionized water and 0.4 part of Levenol WZ (trademark: anionic emulsifier manufactured by Kao Sekken K.K.) and the content was heated to 85° C. A polymerization initiator solution was prepared by dissolving 4 parts of azobiscyanovaleric acid into a mixture of 80 parts of deionized water and 2.6 parts of dimethyl amino ethanol. While maintaining the temperature of the reactor content at 85° C., the above-said initiator solution was dropwise added to the reactor in 80 minutes. After elapsing 10 minutes from the commencement of said addition of initiator solution, a monomer mixture of 20 parts of NK ester A-600 (trademark: polyethylene glycol #600 diacrylate, Shin Nakamura Kagaku K.K.), 70 parts of methyl methacrylate, 85 parts of ethyl acrylate, 3 parts of methacrylic acid, and 22 parts of 2-hydroxyethyl acrylate was dropwise added in 60 minutes from another dropping funnel.

After completion of the addition of said initiator solution, the reaction mixture was maintained at 85° C. and stirred at the same temperature for 90 minutes. Thus obtained emulsion contained polymer particles having an average diameter of 160 nm and being of swell characteristics but insoluble in methyl ethyl ketone.

EXAMPLE 4

Ino a similar reaction vessel as used in Example 1, were placed 520 parts of deionized water and the temperature was raised to 80° C. To this, a polymerization initiator solution of 2.4 parts of ammonium persulfate in 80 parts of deionized water was added and the mixture was maintained at 80° C. for 15 minutes. Thereafter, a monomer mixture of 2 parts of NK ester 23G (trademark: polyethyleneglycol #1000 dimethacrylate, Shin Nakamura Kagaku K.K.) and 80 parts of methyl methacrylate was added and the mixture was maintained at 80° C. for 20 minutes. The reaction mixture showed a bluish color and slight milkiness. Then, a monomer mixture consisting of 28 parts of NK ester 23G, 22 parts of methyl methacrylate, 50 parts of styrene, 71 parts of n-butyl acrylate, 5 parts of methacrylic acid, and 14 parts of 2-hydroxy ethyl methacrylate was dropwise added in 60 minutes and the reaction mixture wa maintained at 85° C. and stirred at the same temperature for 150 minutes. Thus obtained emulsion contained polymer particles having an average diameter of 260 nm and being insoluble in methyl ethyl ketone.

EXAMPLE 5

Into a similar reaction vessel as used in Example 1, were placed 520 parts of deionized water and 0.1 part of Emarl 0 (trademark: anionic emulsifier: Kao Sekken K.K.) and the mixture was heated to 80° C. While maintaining the same temperature, a polymerization initiator solution of 2 parts of ammonium persulfate in 80 parts of deionized water was added and the mixture was stirred for 15 minutes. Thereafter, 3 parts of NK ester 9G (trademark: polyethylene glycol #400 dimethacrylate: Shin Nakamura Kagaku K.K.) and 7 parts of ethyl acrylate were added and the reaction mixture was maintained at 80° C. for 20 minutes. The reaction mixture showed a bluish color. Next, a monomer mixture of 7 parts of NK ester 9G, 40 parts of styrene, 73 parts of ethyl acrylate, 50 parts of n-butyl methacrylate, 2 parts of acrylic acid and 18 parts of 2-hydroxyethyl acrylate was dropwise added in 60 minutes and the reaction mixture was heated to 85° C. and stirred at the same temperature for 150 minutes. Thus obtained emulsio contained polymer particles having an average diameter of 180 nm and being of swell characteristics but insoluble in methyl ethyl ketone.

COMPARATIVE EXAMPLE 1

The same procedures as stated in Example 1 were repeated with the same materials with those of Example 1 excepting substituting NK ester 1G (trademark: ethyleneglycol dimethacrylate: Shin Nakamura Kagaku K.K.) for NK ester 23G. However, the reaction mixture agglomerated during the course of reaction and it was unable to obtain an emulsion.

COMPARATIVE EXAMPLE 2

The same procedures as stated in Example 1 were repeated with the materials shown in Example 1, excepting substituting NK ester 1G for NK ester 23G and placing in the reactor 520 parts of deionized water and 8 parts of Levenol WZ instead of 520 parts of deionized water alone. Thus obtained emulsion contained polymer particles having an average diameter of 120 nm and being insoluble in methyl ethyl ketone.

EXAMPLE 6

To a resin varnish made of 100 parts of a styrene-acrylic resin having the monomer composition: 26 wt. % of methyl methacrylate, 15 wt. % of styrene, 35 wt. % of 2-ethyl hexyl acrylate, 8 wt. % of acrylic acid, and 16 wt. % of 2-hydroxy propyl acrylate and having a number average molecular weight of 8300, and 25 parts of butyl Cellosolve, were added 9.9 parts of dimethyl amino ethanol and the mixture was heated to 80° C. While maintaining the same temperature and kept stirring, 178 parts of deionized water were dropwise added and the combined mixture was stirred at 70° C. for 60 minutes to obtain an aqueous styrene-acrylic resin varnish. To 100 parts of said aqueous resin varnish, were added 128 parts of Typak R-930 (trademark: Titaminum white: Ishihara Sangyo K.K.), 40 parts of Sumimar M-40W (trademark: melamine-formaldehyde resin: Sumitomo Chem. Co., Ltd.) and 12 parts of deionized water and the mixture was kneaded well to obtain a pigment dispersion paste. A coating composition was then prepared by combining 100 parts of said igment dispersion paste, 48 parts of the aforesaid aqueous styrene-acrylic resin varnish, and 22 parts of the emulsion obtained in Example 1 and diluting the mixture with deionized water to a viscosity of 30 seconds/Ford Cup #4 (25° C.). Thus obtained coating composition was spray-coated onto a degreased and polished steel plate so as to give a dry film thickness of 3μ, and after setting for 10 minutes, baked at 40° C. for 25 minutes to obtain a test plate.

EXAMPLE 7 to 10

The similar test plates were prepared as in Example 6. However, in these Examples, the emulsion of Example 1 was replaced by the same amount of the individual emulsions of Examples 2 to 5.

COMPARATIVE EXAMPLE 3

The procedures of Example 6 were repeated with a modification of substituting the emulsion of Comparative Example 2 for the emulsio of Example 1, to obtain a Comparative test plate. Using the test plates obtained in Examples 6 to 10 and Comparative Example 3, the following tests were carried out and the test results were shown in Table 1.

(1) hot water resistance test:

After dipping in a hot water (160° C.) for 72 hours, the film condition was observed.

O . . . good condition

X . . . loss in gloss, stain formation (2) water resistance test

After dipping in water (20° C.) for 120 hours, the film condition was observed.

O . . . good condition

X . . . loss in gloss, stain formation (3) Alkali resistance test

After dipping in 5% aqueous NaOH solution (20° C.) for 72 hours, the film condition was observed.

. . . good condition

. . . loss in gloss, stain formation (4) Pencil hardness test (5) Weather resistance test:

Gloss retention was determined, after illuminating in Sunshine Weather-O-meter for 2000 hours.

TABLE 1

|  | Example |  |  |  |  | Comparative Example |
|---|---|---|---|---|---|---|
|  | 6 | 7 | 8 | 9 | 10 | 3 |
| hot water resistance |  |  |  |  |  | X |
| water resistance |  |  |  |  |  | X |
| alkali resistance |  |  |  |  |  | X |
| pencil hardness | 2H | 3H | 2H | 2H | H | F |
| weather resistance | 80% | 83% | 76% | 77% | 72% | 55% |

What is claimed is:

1. A method for preparing particles of a crosslinked polymer comprising reacting 0.5 to 50 parts by weight of di (meth) acryloyl bearing compound (A) of the formula

wherein $R_1$ and $R_2$ each represents hydrogen or methyl group, and n is an integer of 4 to 30, and 99.5 to 50 parts by weight of at least one other copolymerizable unsaturated monomer (B), in an aqueous medium and in the absence of a dispersion stabilizer, through an emulsion polymerization said copolymerizable unsaturated monomer (b) being selected from the group consisting of a carboxyl group bearing monomer, a hydroxyl group bearing monomer, a nitrogen containing alkyl acrylate or methacrylate, a copolymerizable amide, a polymerizable nitrile, an alkyl acrylate or methacrylate, a polymerizable aromatic compound, an α-olefin, a vinyl compound and a diene compound.

2. A method for preparing particles of a crosslinked polymer composed of 0.5 to 50 parts by weight of di (meth) acryloyl bearing compound and 95.5 to 50 parts by weight of at least one other copolymerizable unsaturated monomer comprising effecting the first step of emulsion polymerization with the di (methyl) acryloyl bearing compound (A) of the formula

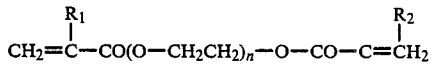

wherein $R_1$ and $R_2$ each represents hydrogen and methyl group and n is an integer of 4 to 30, and at least one other copolymerizable unsaturated monomer (B) in a weight ratio of 9:1 to 1:9 in an aqueous medium to obtain an oligomer and effecting the second step of emulsion polymerization with the di (meth) acryloyl bearing compound (A) and at least one other copolymerizable unsaturated monomer (B) in the presence of 1 to 30 parts by weight of said oligomer in an aqueous medium, or continuing the first step of emulsion polymerization while adding an additional amount of the copolymerizable unsaturated monomer (B), said monomer (B) being selected from the gorup consisting of a carboxyl group bearing monomer, a hydroxyl group bearing monomer, a nitrogen containing alkyl acrylate or methacrylate, a polymerizable amide, a polymerizable nitrile, an alkyl acrylate or methacrylate, a polymerizable aromatic compound, an α-olefin, a vinyl compound and a diene compound and wherein said emulsion polymerization steps are conducted in the absence of dispersion stabilizer.

* * * * *